(12) United States Patent (10) Patent No.: US 11,287,963 B2
Andrizzi et al. (45) Date of Patent: Mar. 29, 2022

(54) CREATION OF CUSTOM USER INTERFACE CONTROLS THAT ARE ASSOCIATED WITH PHYSICAL DEVICES

(71) Applicant: Amazon Technologies, Inc., Seattle, WA (US)

(72) Inventors: Stephan Josef Andrizzi, San Francisco, CA (US); Kara Cavallaro, Seattle, WA (US); Jai Prakash Chabria, Seattle, WA (US); Nicole Dare, Shoreline, WA (US); Kenneth DeLand, Issaquah, WA (US); Nirav Praful Desai, Sammamish, WA (US); Anindya Guha, Seattle, WA (US); Marc Hensley, Seattle, WA (US); Douglas James Herrington, Seattle, WA (US); Samuel Stevens Heyworth, Seattle, WA (US); Apoorva Iyer, Bellevue, WA (US); Nitish Kumar, Seattle, WA (US); Hannah McClellan Richards, Seattle, WA (US); Jae Park, Bellevue, WA (US); Amir Pelleg, Seattle, WA (US); Jessica Protasio, Seattle, WA (US); Daniel Benjamin Rausch, Seattle, WA (US); Laura Allison Ridlehoover, Seattle, WA (US); Jeffrey Rosenberg, Seattle, WA (US); John Shaw, Seattle, WA (US); Paul Warren Smart, Seattle, WA (US); Amirali Virani, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/870,731

(22) Filed: May 8, 2020

(65) Prior Publication Data

US 2020/0272316 A1 Aug. 27, 2020

Related U.S. Application Data

(63) Continuation of application No. 15/398,659, filed on Jan. 4, 2017, now Pat. No. 10,664,146.

(51) Int. Cl.
*G06F 3/0484* (2013.01)
*G06F 3/04847* (2022.01)
(Continued)

(52) U.S. Cl.
CPC ...... *G06F 3/04847* (2013.01); *G06F 3/04842* (2013.01); *G06Q 30/0601* (2013.01);
(Continued)

(58) Field of Classification Search
CPC ............ G06F 3/04847; G06F 3/04842; G06F 3/0482; G06F 3/04817; G06Q 30/0601;
(Continued)

(56) References Cited

U.S. PATENT DOCUMENTS 5,960,411 A 9/1999 Hartman et al.
6,014,638 A 1/2000 Burge et al.
(Continued)

FOREIGN PATENT DOCUMENTS

WO WO 2009/142768 A1 11/2009

OTHER PUBLICATIONS

Roberts, Emily, 'Introducing the Amazon Dash Button and Dash Replenishment Service,' Amazon 2 Appstore Biogs, dated Mar. 31, 2015, retrieved Oct. 25, 2016, available at https://developer.amazon.com/blogs/appstore/post/Tx3N3VXX052B1 SI/introducing-the-amazon-dashbutton-and-dash-replenishment-service.
(Continued)

*Primary Examiner* — Dino Kujundzic
(74) *Attorney, Agent, or Firm* — Knobbe, Martens, Olson & Bear, LLP (57) ABSTRACT

Systems, methods, and computer-readable media are described for creating custom user interface ("UI") controls.
(Continued)

A networked computing service may determine that an action performed by a user of the service is likely to be repeated, based on previous actions performed by the user and/or other users, parameters of the action including characteristics of an item associated with the action, and other criteria. The networked computing service may generate, or recommend generation of, a custom UI control that automates performance of the action. The networked computing service may automatically determine parameters of the action, and may determine alternative parameters and/or alternative actions if the action cannot be performed using the determined parameters. Custom UI controls may be associated with various computing devices and/or other electronic devices, and categories of custom UI controls may be determined and displayed.

20 Claims, 9 Drawing Sheets

(51) Int. Cl.
    *G06F 3/04842*     (2022.01)
    *G06Q 30/06*     (2012.01)
    *H04L 67/01*     (2022.01)

(52) U.S. Cl.
    CPC ..... *G06Q 30/0641* (2013.01); *G06Q 30/0625* (2013.01); *H04L 67/42* (2013.01)

(58) Field of Classification Search
    CPC ........... G06Q 30/0641; G06Q 30/0625; G06Q 30/0643; H04L 67/42; H04L 67/02; H04L 67/306; H04L 67/22
    See application file for complete search history.

(56) References Cited

U.S. PATENT DOCUMENTS

| | | | |
|---|---|---|---|
| 7,827,157 B2 | 11/2010 | Shilo et al. | |
| 7,886,011 B2 | 2/2011 | Buchheit | |
| 8,090,626 B1 * | 1/2012 | Wijaya | G06Q 30/0631 |
| | | | 705/26.8 |
| 8,417,357 B2 | 4/2013 | Husoy et al. | |
| 8,856,958 B1 | 10/2014 | Kosslyn et al. | |
| 8,898,573 B2 | 11/2014 | Chang et al. | |
| 8,959,476 B2 | 2/2015 | Ramani et al. | |
| 9,003,295 B2 | 4/2015 | Baschy | |
| 9,003,296 B2 | 4/2015 | Murthy et al. | |
| 9,563,877 B2 | 2/2017 | Macbeth et al. | |
| 9,779,457 B1 | 10/2017 | Fisher et al. | |
| 10,198,707 B1 | 2/2019 | Bolton et al. | |
| 10,296,195 B2 | 5/2019 | Andrizzi et al. | |
| 2004/0003406 A1 | 1/2004 | Billmaier | |
| 2007/0203804 A1 | 8/2007 | Kargman | |
| 2009/0112474 A1 | 4/2009 | Chakrapani et al. | |
| 2010/0257479 A1 | 10/2010 | Do et al. | |
| 2011/0231224 A1 | 9/2011 | Winters | |
| 2011/0231225 A1 | 9/2011 | Winters | |
| 2013/0073473 A1 | 3/2013 | Heath | |
| 2014/0007012 A1 | 1/2014 | Govande et al. | |
| 2015/0006314 A1 | 1/2015 | Goulart et al. | |
| 2015/0120761 A1 | 4/2015 | Lounsbury et al. | |
| 2015/0277681 A1 | 10/2015 | Isaacson et al. | |
| 2016/0148161 A1 | 5/2016 | Ciccarelli | |
| 2016/0239885 A1 | 8/2016 | Goolsby | |
| 2017/0061521 A1 | 3/2017 | Lee et al. | |
| 2017/0192626 A1 | 7/2017 | Virk et al. | |
| 2018/0173403 A1 | 6/2018 | Carbune et al. | |
| 2018/0188934 A1 | 7/2018 | Andrizzi et al. | |
| 2018/0247243 A1 | 8/2018 | Moolman et al. | |

OTHER PUBLICATIONS

International Search Report and Written Opinion in PCT/US2017/067826 dated Apr. 17, 2018.
International Preliminary Report on Patentability in 2017/067826 dated Jul. 9, 2019.

* cited by examiner

CREATION OF CUSTOM USER INTERFACE CONTROLS THAT ARE ASSOCIATED WITH PHYSICAL DEVICES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 15/398,659, entitled "CREATION OF CUSTOM USER INTERFACE CONTROLS THAT ARE ASSOCIATED WITH PHYSICAL DEVICES" and filed on Jan. 4, 2017, the disclosure of which is incorporated herein by reference.

BACKGROUND

Generally described, operators of computing services may provide user interfaces ("UIs") that enable users to browse and select the items made available through the service. A graphical user interface may provide hierarchical menus, search fields, and other controls to facilitate access, and may provide user-specific controls such as listings of recent orders or selectable item recommendations.

Users of computing services may thus perform various actions relating to the services by invoking various controls of the provided user interfaces. However, the functionality of the provided user interfaces may be limited by the service's inability to anticipate the user's actions, and these limitations of the user interfaces may reduce utilization of the computing services.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to user interfaces. More specifically, aspects of the present disclosure are directed to systems, methods, and computer-readable media related to generating and managing customized, user-specific graphical user interface controls. Illustratively, an operator of a computing service may present a user interface with controls that enable a user to search for items available through the networked computing service, review a list of common items, navigate a hierarchy of items, and so forth. These controls may allow the user to perform a recurring activity, such as an item acquisition, but may require that the user repeatedly perform multiple interactions with the general user interface controls in order to complete the activity. Additionally, the user may repeat some activities on a regular but infrequent basis (once a year, as-needed, etc.), such that the interactions required to repeat the activity do not become familiar to the user. For example, in a traditional electronic catalog environment, if a given user orders a specific item on an infrequent basis, the user will typically navigate through multiple interfaces or pages (such as an initial search page to locate a listing for the item, or a page listing a number of past orders by the user to locate an order that includes the item) in order to eventually reach a page that includes a selectable option to place a new order for the item, at which point the user would typically provide additional order details.

The computing service described herein may generate custom user interface controls that are customized for the activities of a particular user. These custom user interface controls may be generated based on, for example, analyses of user account details and activity histories (of either the particular user or other users), analyses of activities relating to a particular item, user input with regard to a generated or recommended custom user interface control, and/or configuration data associated with a physical device. In some embodiments, the computing service may present the user with an option to generate a custom user interface control to automate a recurring activity, or may automatically generate the control and present the user with options to keep or delete it.

Illustratively, the computing service may determine that the user is performing, or is being presented with the option to perform, an action that is frequently repeated or likely to be frequently repeated. The computing device may then present the user with an option to generate a custom user interface control, which in turn may, when selected, automatically perform the action without requiring the user to interact further with the presented user interface. For example, the computing service may determine that the user is placing an order for a carton of milk, and may determine based on the user's order history (and/or based on other users' order histories, or based on previous orders for milk) that the user is likely to place additional orders for the same product in the future. The computing service may therefore generate a custom user interface control such as a button that, when selected, automatically places the order for the carton of milk. The custom user interface control may then be re-selected as needed to place further orders.

The computing service may additionally determine parameters to be used when performing the action, and in some embodiments may determine alternate parameters to use and/or alternate actions to perform if the default action cannot be performed using the default parameters. Illustratively, the default action performed upon selection of the custom user interface control may be to place an order for an item, and the parameters to use may include an identifier of the item to be ordered, a quantity of the item, a payment method, a shipping address, a delivery option, and so forth. For example, the default action may be to place an order, and the parameters may be milk, one quart, a price or a price range, a credit card on file, the user's home address, and same-day delivery. The computing service may determine that, for example, if an order cannot be placed using these parameters (e.g., because of an out-of-stock condition), then selecting the custom user interface control may cause an alternative such as ordering a pint of milk, ordering a quart of orange juice, or placing a quart of milk in the user's shopping cart for later order completion. In some embodiments, the generated custom user interface control may require user confirmation before placing an order using a parameter that exceeds a value or threshold (e.g., if the price associated with an item has increased).

The computing service may, in some embodiments, determine a verification step to be performed when the custom user interface control is selected. The verification step may determine whether various conditions are met at the time when the custom user interface control is selected, which in turn may be used to determine whether to perform the default action or an alternative action. For example, the default action may be to place an order using a free next-day shipping parameter, the alternative action may be to prompt the user to renew membership in a group that is eligible for free next-day shipping, and the verification step may be to confirm that the user is still a member of the group. As a further example, the parameters associated with an action may be a 32-ounce size and a $7.95 price, and the verification step may be to determine whether another size is available at a lower price per ounce.

In some embodiments, the user may order, register, configure, and/or use a dedicated, physical electronic device that causes an action to be performed when a hardware button on the device is pressed, and the computing service may generate a corresponding custom user interface control. For example, the user may, via a user interface presented by the computing service, configure a physical electronic device to place an order for laundry detergent when the device's button is pressed. The computing service may therefore generate a custom user interface control that places the same order when the control is selected. In various embodiments, the computing service may generate a custom user interface control whose visual appearance resembles the visual appearance of the physical electronic device. For example, the physical electronic device and the custom user interface control may both display an image of common branding and/or product information.

By way of example, a physical electronic device, described herein as a "dash button," may include a single hardware button with very little electronics, processing, or memory capabilities other than those needed to allow the user to generate and submit a request to perform an action. When pressed, the dash button may communicate sufficient information (e.g., device identifier information) that may be processed by the computing service to identify the action to perform and the parameters to be used when performing the action, such as by retrieving stored action and parameter information previously associated with the given device identifier. The computing service may then perform the action using the parameters. The computing service may thus generate a custom user interface control that has the dash button device identifier information as a parameter, and may also process the device identifier information to identify the action and associated parameters when the custom user interface control is selected. In some embodiments, the computing service may identify the action to perform when a dash button is pressed by identifying a corresponding custom user interface control and then obtaining the action and the parameters associated with the custom user interface control. In further embodiments, the computing service may generate a custom user interface control based on a dash button usage history. For example, the computing service may identify a dash button that is frequently pressed and has no corresponding custom user interface control, and may generate a custom user interface control accordingly.

In some embodiments, the computing service may cause delivery of, or may prompt the user to order, a corresponding physical dash button when the computing service generates a custom user interface control. For example, the computing service may provide a user interface with options for creating custom user interface controls, as described below. The user interface may include an option to order a physical dash button that corresponds to the created custom user interface control, which if selected causes delivery of a dash button that is preconfigured to perform the same action and use the same parameters as the custom user interface control. In further embodiments, the computing service may deliver (or provide an option to order) a physical dash button at a later time, or may automatically configure and deliver a physical dash button based on criteria such as a history of orders placed using the custom user interface control. Still further, in some embodiments, the computing service may analyze other information, such as geolocation data from a mobile computing device, to determine that a corresponding physical dash button should be provided for a custom user interface control.

In further embodiments, the computing service may generate custom user interface controls based on a category. For example, a user may request display of items in a particular category. The computing service may therefore generate custom user interface controls associated with the category and/or with actions taken by the user that are associated with items in the category. For example, the user may request display of items in a gardening category. The computing service may therefore display gardening-related items, and may generate custom user interface controls based on characteristics of items within the category. For example, the computing service may determine that a lawn care product in the category is likely to be ordered repeatedly, and may therefore generate a custom user interface control for ordering and reordering the product. Conversely, the computing service may determine that a wheelbarrow is unlikely to be ordered repeatedly, and may determine not to generate a custom user interface control for automating that order process.

Although described herein for purposes of example with regard to placing orders for products, it will be understood that the present disclosure is not limited by the action or type of action that may be performed when a custom user interface control is selected. For example, the computing service may generate a custom user interface control that is selectable to make a donation, schedule an appointment, send a message, reserve or release a resource, adjust home lighting or temperature, start or stop a media player or other device, increase or decrease a volume or channel setting, or otherwise perform any repeatable action.

By generating relevant custom user interface controls, the computing service may create a customized user experience that cannot be duplicated in the pre-Internet world. For example, the computing service may create the digital equivalent of a grocery store in which one of the aisles is specific to the individual shopper and contains items that the store has determined the shopper is likely to reorder.

As used herein, the term "action," in addition to having its ordinary meaning, is used to refer to an act (e.g., order, add to shopping cart, subscribe to, download, etc.) but not to the direct object of such act (e.g., item, file, membership, etc.). For example, when an item is ordered, the act of ordering may be the action and the item may be a parameter based on which the action is performed. The parameters of an action, as used herein, may refer to the direct object of an action (e.g., item, file, membership, etc.). Parameters may also include additional information, data, or attributes used to perform an action (e.g., shipping method, shipping address, payment method, etc.), which are sometimes also referred to herein as "action parameters." The term "parameter" may also include parameters associated with a custom user interface control (e.g., item price at the time of creation, item quantity, item type, etc.), which are sometimes also referred to herein as "control parameters." As will be apparent from context, the term "parameter" is also sometimes used to refer to both an attribute (e.g., price) and its value (e.g., $49.95). Additionally, as used herein, the term "item," in addition to having its ordinary meaning, is used interchangeably to refer to an item itself (e.g., a particular product, service, or any other subject of an action) and to its description or representation in a computer system. As will be apparent from the context in which it is used, the term "item" is also sometimes used herein to refer only to the item itself or only to its representation in the computer system. Further, not necessarily all advantages described herein are shared by every embodiment of this disclosure.

The foregoing aspects and many of the attendant advantages will become more readily appreciated as the same become better understood by reference to the following descriptions of illustrative embodiments, when taken in conjunction with the accompanying drawings depicting the illustrative embodiments.

Figure 1A:
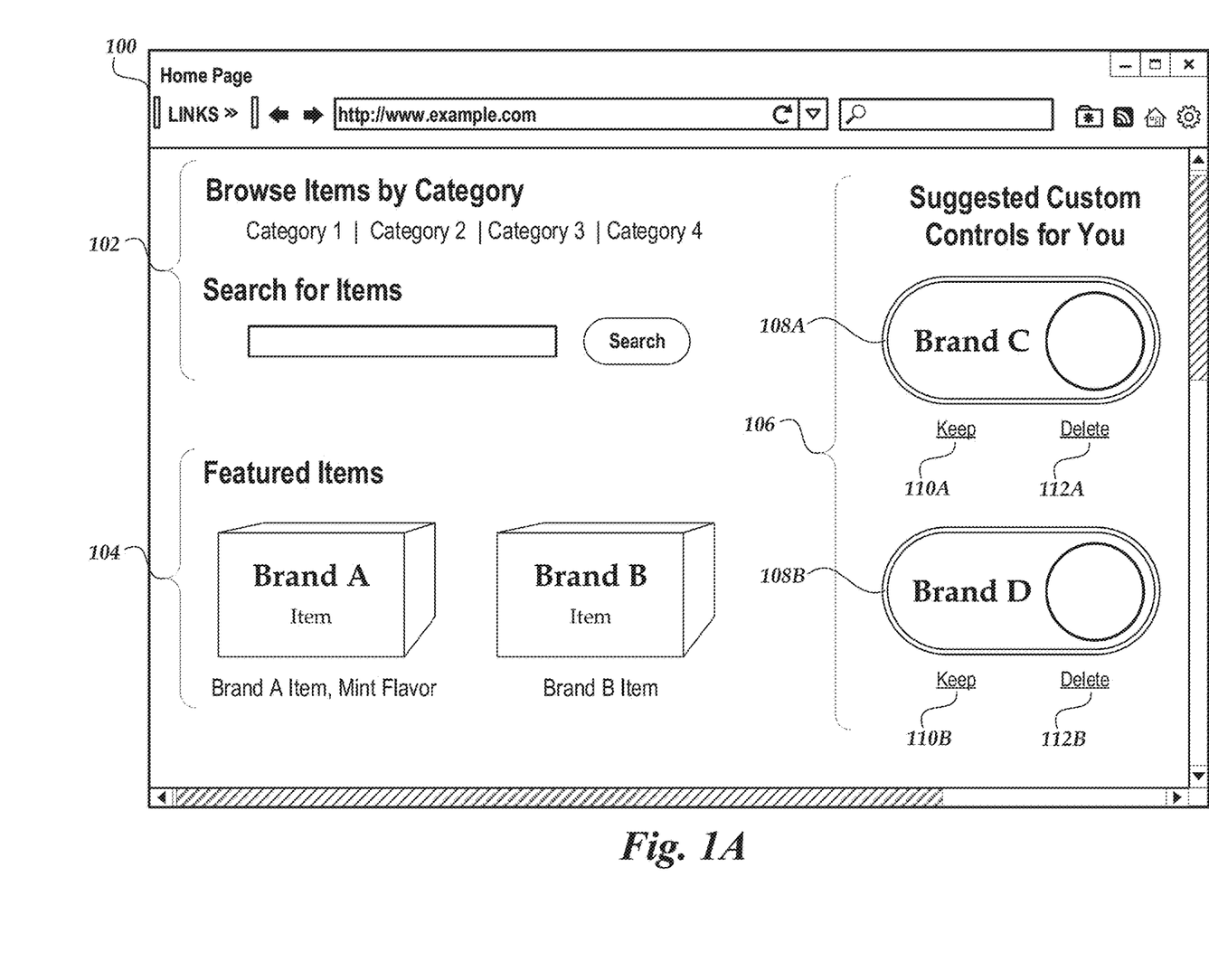
FIG. 1A is an illustrative user interface that depicts automatically generated custom user interface controls and options for managing the custom user interface controls.

FIG. 1A depicts an illustrative user interface 100 that may be generated according to aspects of the present disclosure. Although depicted as a web-based interface for purposes of illustration, the user interface 100 is not limited to a particular mode of presentation, and aspects of the present disclosure include presentation in other formats, as discussed below. In the illustrated embodiment, the user interface 100 includes general user interface controls 102, which may be used to browse and/or search for items, and which may cause display of other user interfaces and/or controls (such as the user interface 120 of FIG. 1B or the user interface 140 of FIG. 1C) for completing an action with regard to a particular item.

The user interface 100 further includes a featured item gallery 104, which in the illustrated embodiment include a "Brand A" item having particular characteristics (e.g., a mint flavor) and a "Brand B" item. In various embodiments, the user interface 100 may include multiple featured item galleries 104, whose items may be searched, sorted, filtered, and selected according to various criteria.

The user interface 100 further includes a custom control creation panel 106, which enables the creation of proposed custom user interface controls 108A and 108B. Illustratively, a computing device may recommend creation of a custom user interface control 108A that, when selected, causes placement of an order for a "Brand C" item using a specified set of parameters. The custom user interface control 108A may be generated based on, for example, an order history of the user, order histories of other users, or other criteria. The custom control creation panel 106 further includes a keep option 110A and a delete option 112A. The keep option 110A, if selected, causes the proposed custom user interface control 108A to be generated and added to the user's collection of custom controls. The delete option 112A, if selected, causes the proposed custom user interface control 108A to be deleted. Similarly, the custom user interface control 108B causes placement of an order for a "Brand D" item when selected, and the keep option 110B and delete option 112B cause the proposed custom user interface control 108B to be kept or deleted, respectively.

Figure 1B:
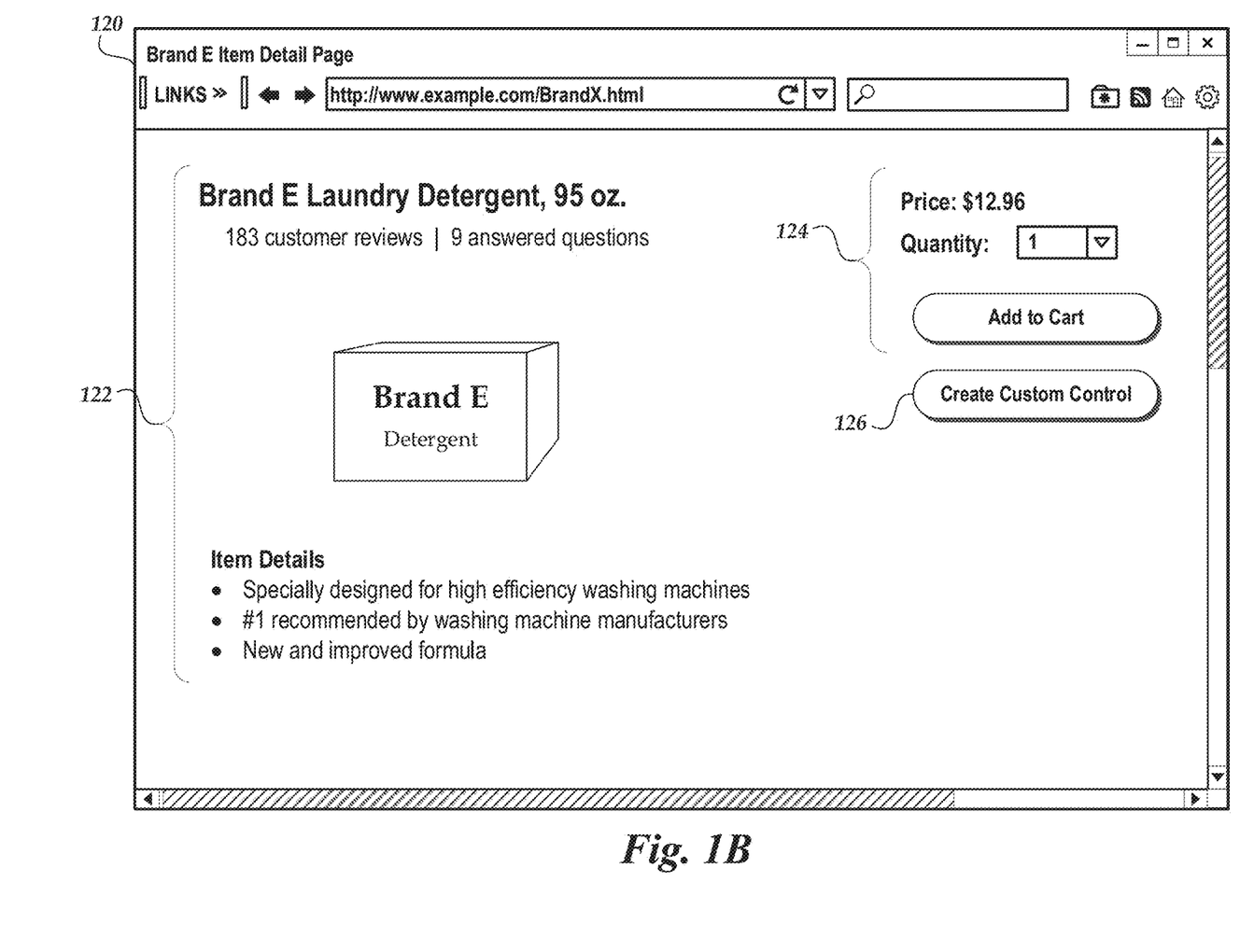
FIG. 1B is an illustrative user interface that depicts an item detail page including an option to generate a custom user interface control that pertains to the item.

FIG. 1B depicts an illustrative user interface 120 that may be generated according to further aspects of the present disclosure. The user interface 120 includes an item detail 122, which displays information regarding a particular item that is available from a computing service. In the illustrated embodiment, the particular item is "Brand E" laundry detergent, and the item detail 122 includes information regarding Brand E product features.

The user interface 120 further includes item order options 124, which enable placing an order for the item. The item order options 124 may include user interface controls that enable specifying parameters such as a quantity of items, a shipping address, payment method, and the like. In some embodiments, some or all of the item order options 124 may be displayed in a separate user interface, such as an electronic shopping cart user interface.

The user interface 120 further includes a custom control creation option 126. The custom control creation option 126, if selected, causes generation of a custom user interface control. The generated custom user interface control may illustratively place an order for "Brand E" detergent in a specified quantity, to be delivered to a specified shipping address, and purchased using a specified payment method. In some embodiments, the order parameters may be specified using the item order options 124. In other embodiments, selection of the custom control creation option 126 may cause display of a separate user interface (not depicted in FIG. 1B) for specifying the parameters and/or the action to be performed by the generated custom user interface control. For example, the generated custom user interface control may place a specified quantity of the "Brand X" product in the user's shopping cart, or may reschedule an already-scheduled delivery of the "Brand X" product to a particular address. In further embodiments, the parameters used with the action may be automatically determined based on order histories, default settings, or other data. In some embodiments, a subset of the parameters to associate with the customer control may be determined from user input via item order options 124, while others may be based on user preferences and/or order history.

In various embodiments, the user interface 120 may further include order history information (e.g., a date of a most recent order of the item, a list of previous orders of the item, an average time interval between orders, and so forth) derived from the user's order history, from the order histories of other users, or from a history of orders of the item. Additionally, in some embodiments, the user interface 120 may display item details for a plurality of "Brand E" items, and may display multiple custom control creation panels 106 or a panel for specifying which of the "Brand E" items to associate with a newly generated custom control.

Figure 1C:
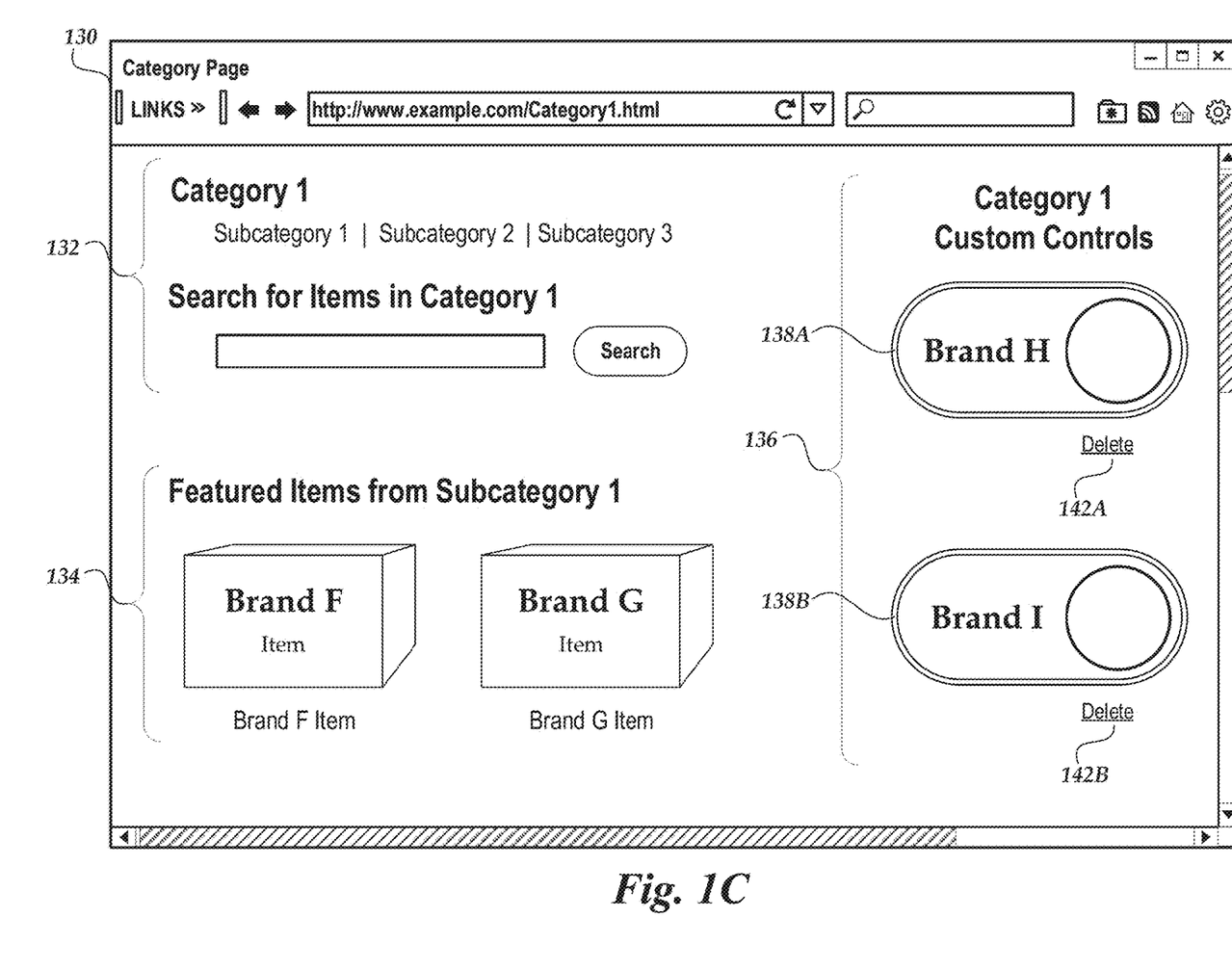
FIG. 1C is an illustrative user interface that depicts an item category page including automatically generated custom user interface controls pertaining to items within the category and options for managing the custom user interface controls.

FIG. 1C depicts an illustrative user interface 130 that displays a particular category of items along with automatically generated custom user interface controls 138A-B that are specific to the category. The user interface 130 includes category user interface controls 132, which enable browsing and searching for items within the category in similar fashion to the general user interface controls 102 described with reference to FIG. 1A. The user interface 130 further includes a featured item gallery 134, which is similar to the featured item gallery 104 depicted in FIG. 1A, except that the featured items are specific to a subcategory of the particular category of items.

The user interface 130 further includes a category-specific custom controls display 136, which displays a number of category-specific custom user interface controls 138A-B. The category-specific custom user interface controls 138A-B may be generated based on, for example, items within the particular category that are frequently reordered. In some embodiments, a different set of category-specific custom user interface controls 138A-B may be displayed for each user. The category-specific custom controls display 136 further includes delete options 142A-B, which enable deletion of the respective controls 138A-B. In some embodiments, the user interface 130 may display suggested category-specific custom user interface controls, and may display a keep option for each such control that enables generation of the control.

Figure 1D:
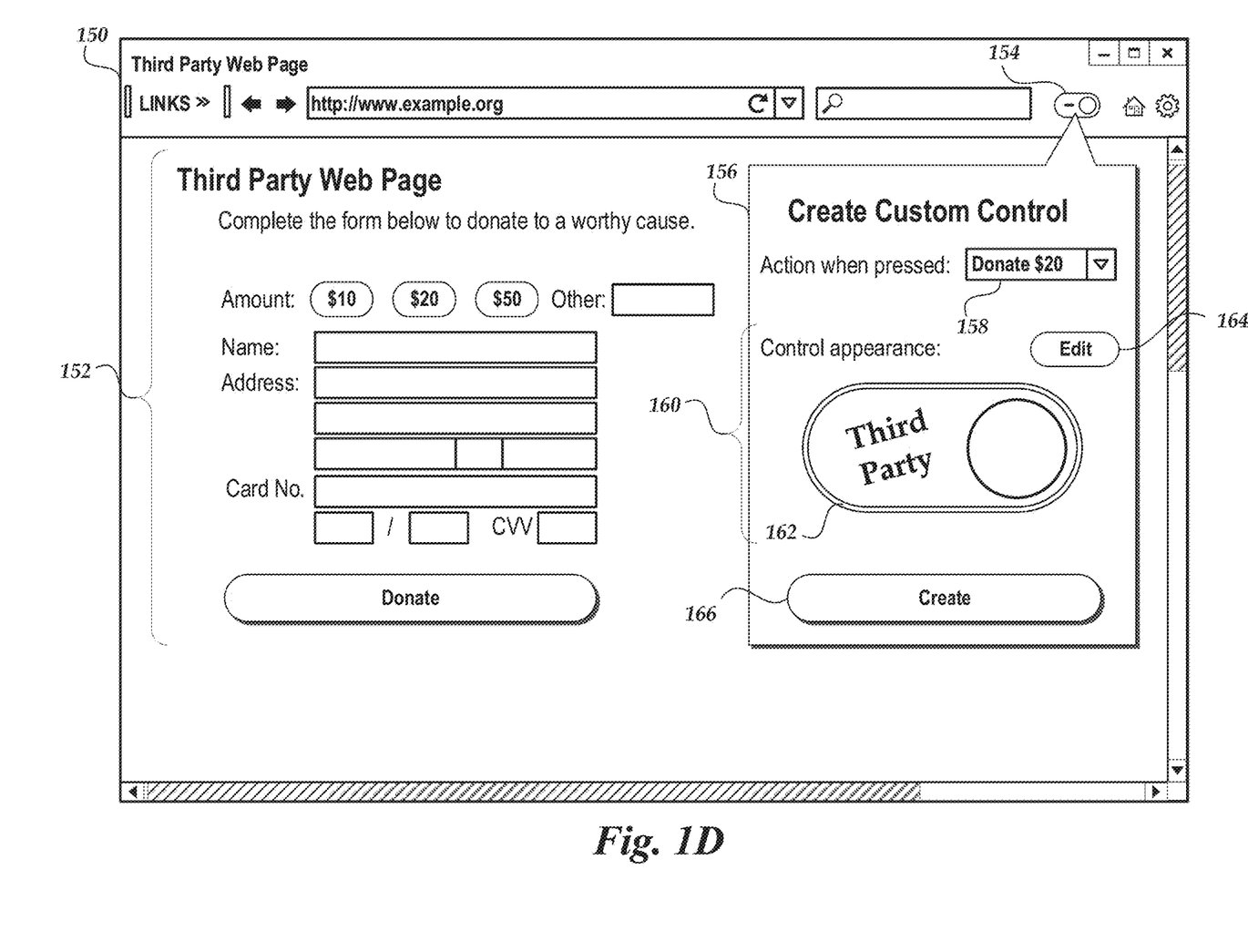
FIG. 1D is an illustrative user interface that depicts a third-party user interface and an option for generating a custom user interface control pertaining to the third-party user interface.

FIG. 1D depicts an illustrative user interface 150 including options for enabling the creation of custom user interface controls for third-party interfaces. The third party that operates or controls a server that generates at least portions of the user interface 150 may be a separate entity from an owner or controller of a server or other computing system that provides the custom user interface control functionality. The user interface 150 includes a third-party interface 152, which includes general controls that enable a user to perform various actions. For example, the illustrated third-party interface 152 enables a user to make donations in various amounts by collecting information such as the amount, a billing address, and other information.

The user interface 150 further enables the creation of custom user interface controls. In the illustrated embodiment, a browser extension displays an icon 154 in the browser interface portion of the user interface 150, and selection of the icon 154 causes display of a custom control creation pop-up window 156. The pop-up window 156 includes an action selector 158, which enables selection of one of the actions made available by the third-party interface 152. The pop-up window 156 further includes a control appearance display 160, which displays a proposed visual appearance of the custom user interface control 162. An edit option 164 enables changing the visual appearance, and a create option 166 enables generation of the proposed user interface control 162.

In some embodiments, a computing service may provide an application programming interface (API) or other interface that a third party may use to provide information enabling the creation of custom user interface controls 162 for the third party. For example, an API may allow a third party to specify the actions that can be associated with a custom user interface control 162, the parameters to use with the actions, the default visual appearance of a custom user interface control, hooks or API calls for performing the various actions, and so forth. In other embodiments, the computing service may instead determine the available actions, parameters, visual appearances, and/or implementations of the actions.

Figure 1E:
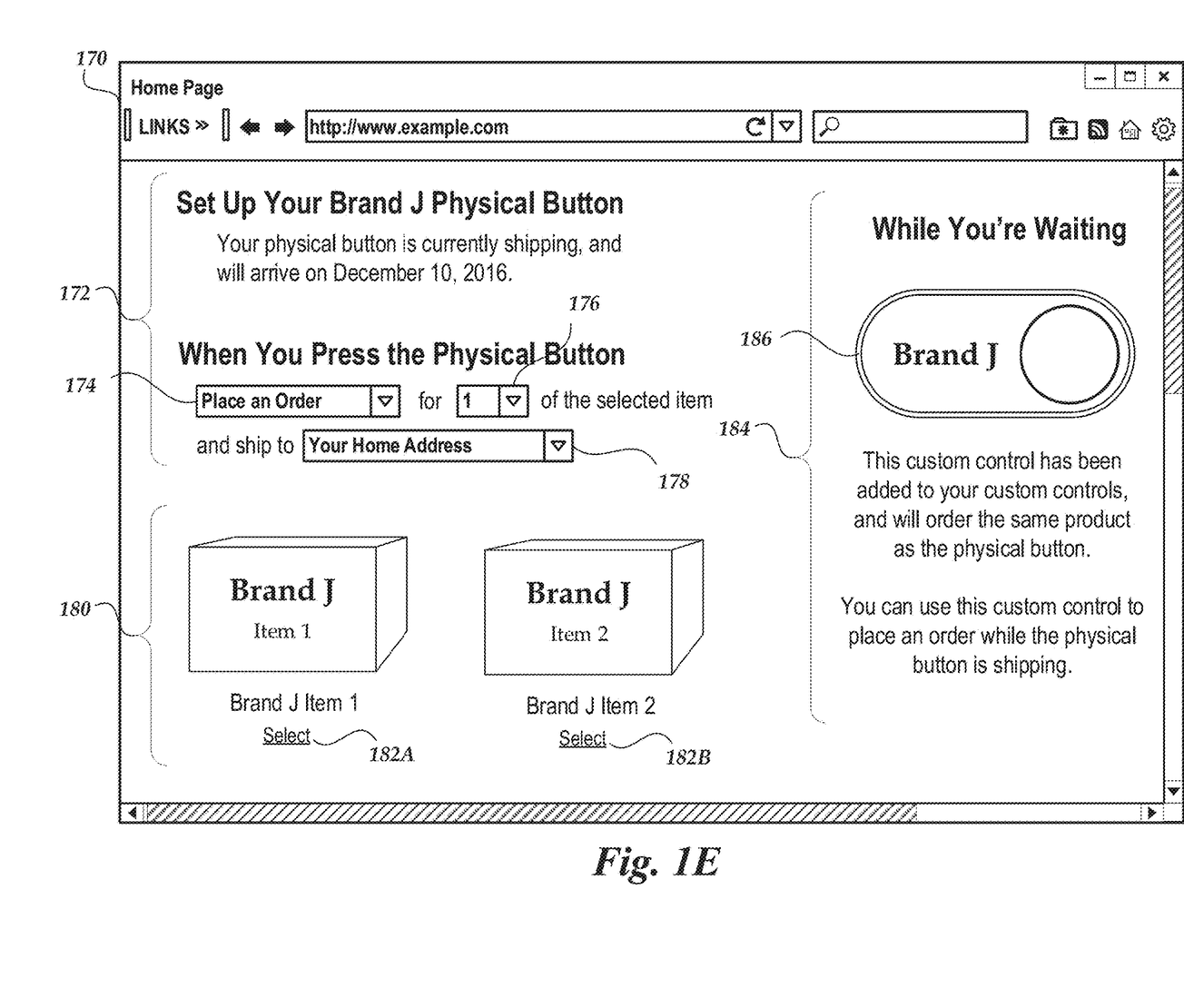
FIG. 1E is an illustrative user interface that depicts options for configuring a physical device and generating a corresponding custom user interface control.

FIG. 1E depicts an illustrative user interface 170 for configuring an electronic device to perform an action and for generating a corresponding custom user interface control 186 that also performs the action when selected. In the illustrated embodiment, the electronic device is associated with "Brand J," and may for example include a visual "Brand J" logo on the electronic device. As illustrated, the user interface 170 includes device setup options 172, which include an action selector 174, quantity selector 176, and a shipping address selector 178. The device setup options 172 may be used to select the action to be performed when the electronic device is activated (e.g., by actuating a physical button on the electronic device) and to select the parameters to use when performing the action. The user interface 170 further includes an item gallery 180 that displays a number of "Brand J" items, one of which may be selected as an action parameter using the select options 182A-B.

The user interface 170 further includes a custom user interface control display 184, which displays a custom user interface control 186 that has been generated to correspond to the configuration of the electronic device. The custom user interface control display 184 may include explanatory text indicating that a custom user interface control 186 has been generated using the action and parameters associated with the electronic device, and that the custom user interface control 186 has been added to the user's custom controls for subsequent access and display via a user interface. In some embodiments, the action and/or parameters associated with the custom user interface control 186 may be updated dynamically as the user changes the corresponding action and parameters for the electronic device.

Figure 1F:
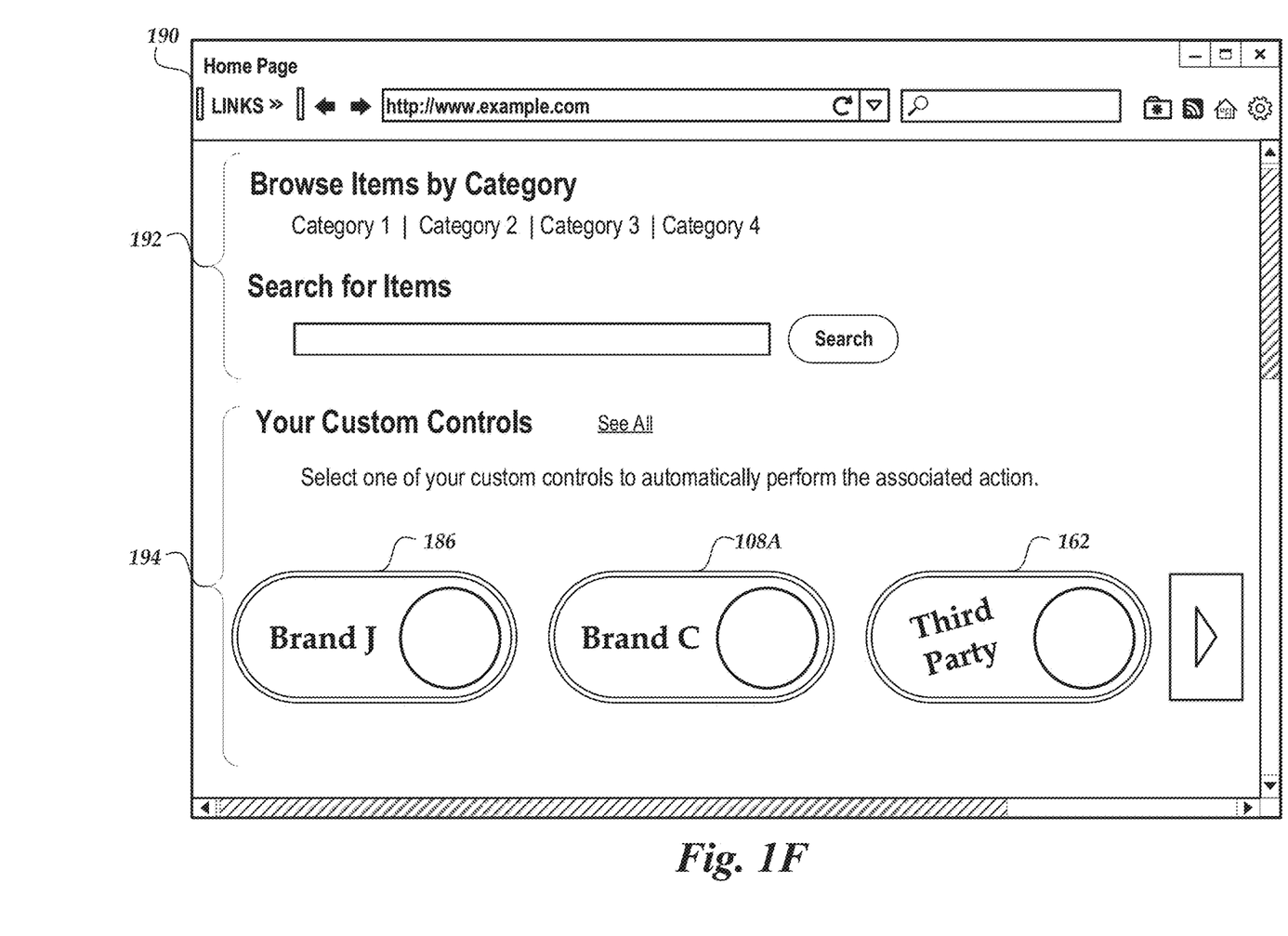
FIG. 1F is an illustrative user interface that depicts custom user interface controls that have been generated for a particular user.

FIG. 1F depicts an illustrative user interface 190 in which the custom controls that have been generated for a particular user are displayed. The user interface 190 includes general user interface controls 192, which enable browsing and searching for items made available by a computing service via the user interface 190. The user interface 190 further includes a custom control region 194, which displays a number of custom user interface controls that have been generated for the user. In the illustrated embodiment, the custom control region 194 displays custom user interface controls 186, 108A, and 162, as previously described with reference to FIGS. 1E, 1A, and 1D respectively.

Various other user interfaces beyond those depicted in FIGS. 1A-1F are within the scope of the present disclosure. For example, the user interfaces depicted in FIGS. 1A-1F may be adapted or modified for display on a mobile computing device, tablet computing device, dedicated hardware device, or other device, and may include more or fewer elements than depicted. In some embodiments, user interfaces may accept audio input, and may enable generation of, for example, custom user interface controls that are activated by speaking particular phrases. The disclosed user interfaces are thus understood to be illustrative and not limiting. Additionally, various other user interfaces may be displayed that enable the creation of custom user interface controls. As examples, user interfaces may be displayed that enable creation of custom user interface controls in conjunction with a user's order history, electronic shopping cart, the item detail page of a previously purchased item, or in conjunction with other information. As a further example, an interface may be presented that enables the creation of custom user interface controls using verbal commands or other audio input. Still further, an application programming interface (API) may be provided that enables creation of custom user interface controls.

Figure 2:
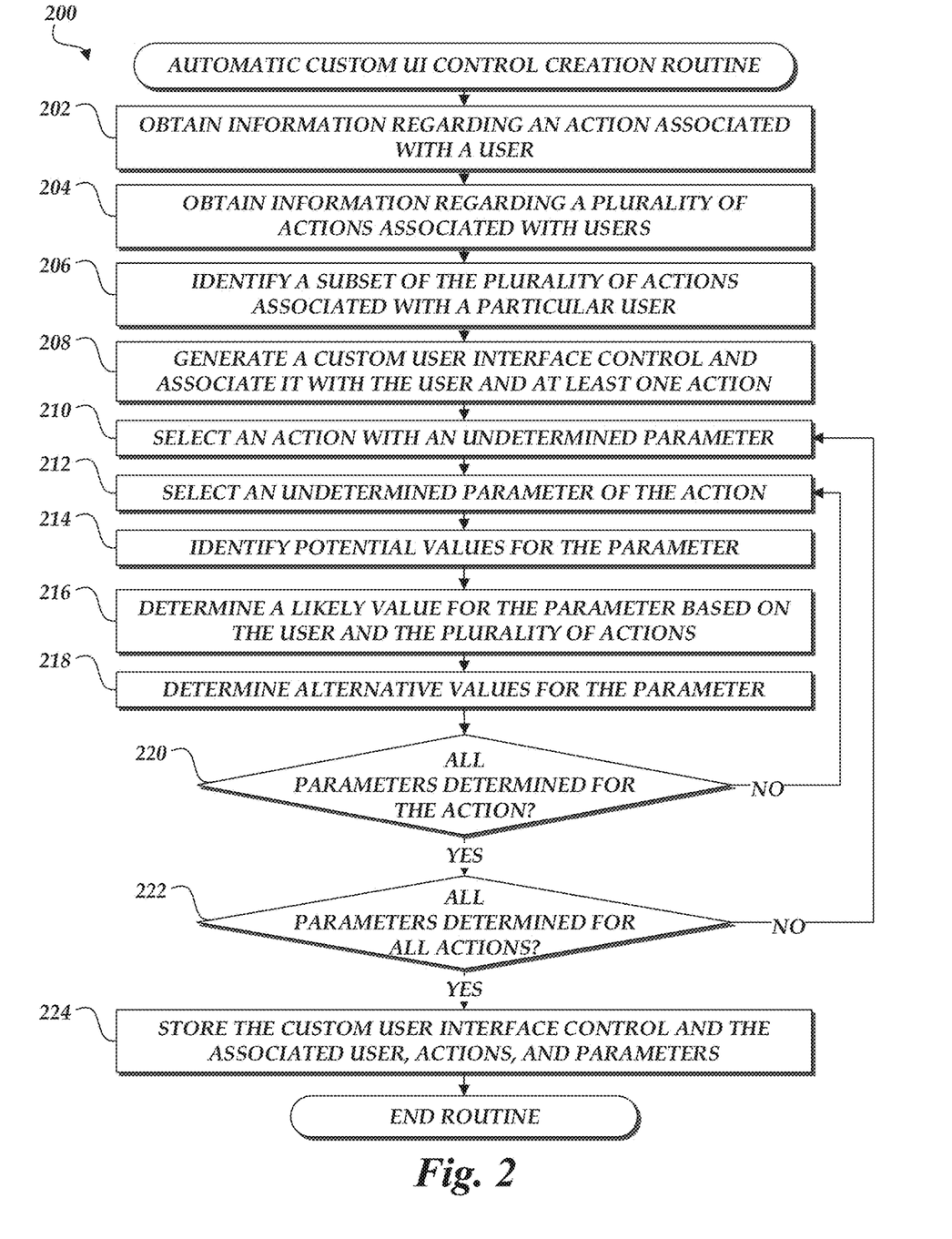
FIG. 2 is a flow diagram depicting an illustrative routine for automatically creating a custom user interface control in accordance with aspects of the present disclosure.

With reference now to FIG. 2, an example action-based custom user interface control creation routine 200 will be described. The example routine 200 may be carried out, for example, by the custom user interface server 400 of FIG. 4, which will be described below. At block 202, information may be obtained regarding an action performed by, or associated with, a user. For example, the action may be placing an order, and the information may include parameters that were used to place the order, such as an item that was ordered, item size, order quantity, payment method, shipping address, delivery method, and the like. The information may further include information regarding the parameters, such an item expiration date, a number of uses of the item (e.g., that the item may be used up to five times), an expected duration of use of the item (e.g., 10,000 hours), an indication that the item is perishable or consumable, an expiry date or a billing address of a payment method, a cost associated with a delivery method, a category of the item, and so forth.

At block 204, information may be obtained regarding a plurality of actions that are associated with users. The plurality of actions may, in some embodiments, be a plurality of previously performed actions. For example, an order history for the user who performed the action in block 202 may be obtained. In some embodiments, order histories may be obtained for a number of users, such as users who have placed orders for the item identified in block 202 or for items in the category of items identified in block 202. In some embodiments, block 202 may be omitted, and the routine 200 may begin by obtaining information regarding a user and a plurality of actions associated with a particular item or a particular category.

At block 206, a subset of the plurality of actions that are associated with the user may be identified. In some embodiments, blocks 204 and 206 may be combined and an order history may be obtained for a particular user. In other embodiments, block 204 may be separated into interactions that are carried out separately, or block 206 may be omitted. For example, information may be obtained regarding a plurality of actions that have not been associated with users, and the actions may then be associated with users (e.g., by cross-referencing with other data sources).

At block 208, a custom user interface control may be generated and associated with the user and at least one action. In some embodiments, the action that is associated with the custom user interface control may be the action for which information was obtained in block 202. In other embodiments block 202 may be omitted, and the action may be determined, for example, by analyzing the plurality of actions and identifying an action that the user performs frequently or on a recurring basis. In further embodiments, a determination may be made that an action is frequently performed with a particular set of parameters, and the set of parameters may be determined and associated with the custom user interface control at block 208. For example, the user's previous actions may be analyzed to determine that the user places an order for delivery of dog food on a recurring basis, or that the user frequently requests that a scheduled biweekly delivery of a particular item be made ahead of schedule. In still further embodiments, the parameters of an action may be analyzed to identify characteristics associated with recurring actions.

In some embodiments, at block 208, a determination may be made as to whether to generate a custom user interface control. For example, a probability may be determined based on information regarding the action, the action's "item" parameter (represented, for example, as an item identifier), the plurality of previous actions, previous actions involving similar items, and/or other information. If a determination is made that the user is unlikely to repeat the action, or that a recurring action cannot be found among the plurality of actions, then the routine 200 may end without creating a custom user interface control. If, however, a determination is made that the probability exceeds a threshold, then the routine 200 may proceed to generate a custom user interface control at block 208. In some embodiments, an action and multiple alternative actions may be associated with and/or stored with the custom user interface control. For example, the custom user interface control may be associated with both placing an order and putting an item in an electronic shopping cart. The action to perform for a given instance of the custom user interface control being selected may then be determined dynamically at the time the control is selected.

At block 210, an action associated with the control that has one or more undetermined parameters may be selected. In some embodiments, as described above, some or all of the parameters used to perform an action may be determined at block 208. In various further embodiments, the routine 200 may treat the parameters determined at block 208 as preliminary determinations, may determine only parameters that were not determined at block 208, or may determine alternative parameters (as described below) and omit blocks 214-216 with regard to the already determined parameters. For example, a "place an order" action may be selected, and one of the parameters used to place the order (e.g., that the product to be ordered is "Brand E" laundry detergent) may have previously been determined and associated with the action. However, the product size, price range, order quantity, method of delivery, payment method, shipping address, and other parameters of the action have not yet been determined.

At block 212, an undetermined parameter of the action may be selected. Continuing the example above, the "price range" parameter may be selected. At block 214, potential values for the parameter may be identified. In various embodiments, a parameter may be identified as a range of acceptable values (e.g., $10-$15), a threshold value (e.g., not to exceed $14), or an absolute value (e.g., $12.96), such that the action associated with the parameter may be determined to be performable if the parameter falls within the range, satisfies the threshold, or equals the absolute value. Potential values for the parameter may be determined, for example, based on previously performed actions. In some embodiments, an order or preference for various potential parameter values may be determined. For example, if the user consistently orders powder detergent in a 143-ounce box, and only orders liquid detergent or smaller sizes of powder detergent when the 143-ounce box is unavailable, then a preference for various parameters may be determined accordingly.

At block 216, a likely value for the parameter may be determined. Continuing the example above, the likely value for a "product size" parameter may be determined to be 143 ounces, based on the user's order history. In some embodiments, a likely value for the parameter may be determined based on the order histories of other users, or based on orders associated with the particular product or item. For example, a determination may be made that a 12-pack of cans of Brand C soft drinks is the most commonly ordered product size.

At block 218, alternative values may be determined for the parameter. Returning to the example above, the user's order history may be analyzed to determine that the customer sometimes orders Brand F liquid detergent in the 170 ounce size, or that the customer sometimes orders a smaller size of the Brand E powder detergent. In some embodiments, sets of alternative values may be determined. For example, a determination may be made that the user orders Brand E powder detergent in the 95-ounce size if the price of the smaller box falls below a threshold, and orders the 143-ounce size otherwise.

At decision block 220, a determination may be made as to whether all parameters have been determined for the action. If not, the routine 200 branches to block 212, where another undetermined parameter may be selected, and the routine 200 then iterates until all of the action's parameters have been determined. Once all of the action's parameters have been determined, the routine 200 branches to decision block 222, where a determination may be made as to whether all parameters have been determined for all actions. If not, the routine 200 branches to block 210, selects another action with undetermined parameters, and iterates until all parameters for all actions have been determined. If all parameters for all actions have been determined, the routine branches to block 224.

At block 224, in some embodiments, the custom user interface control, the associated user, associated action(s), and associated parameter(s) may be stored. For example, the custom control and associated information may be stored in a data store. Each custom user interface control may be assigned a unique identifier, in some embodiments, that may subsequently be used as an index or reference to retrieve associated action and parameter information from a data store. In other embodiments, the custom user interface control and associated information may be output. For example, the custom user interface control may be output via an application programming interface (API) to a third-party device, which may display the generated control or controls.

In various embodiments, the routine 200 may be invoked repeatedly to generate multiple custom user interface controls, or may include an iterative loop that generates multiple controls. In further embodiments, the routine 200 may obtain a category or categories of custom user interface controls and/or parameters associated with actions, and may generate custom user interface controls within the category. Additionally, the blocks of routine 200 may be combined, separated, and/or carried out in other orders within the scope of the present disclosure. For example, block 206 may be omitted, and the custom user interface control may be associated with an action that is determined based on the action histories of several users. As further examples, block 208 may be carried after blocks 210-222, and blocks 214-218 may be combined (e.g., by determining a ranked order of potential parameter values).

Figure 3:
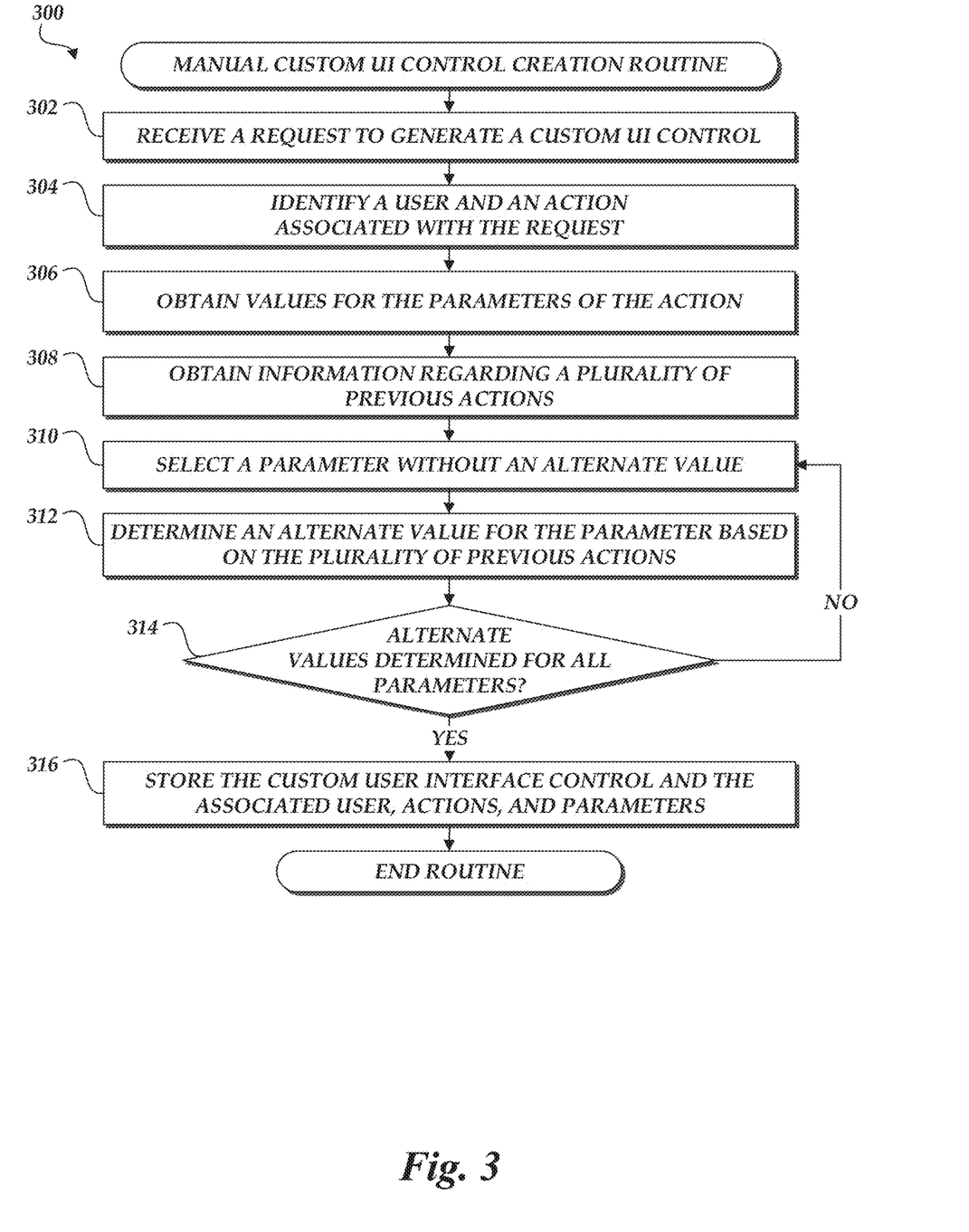
FIG. 3 is a flow diagram depicting an illustrative routine for manually creating a custom user interface control in accordance with aspects of the present disclosure.

Turning now to FIG. 3, an example routine 300 for manual creation of custom user interface controls will be described. The example routine may be carried out, for example, by the custom user interface server 400 of FIG. 4. As used herein, "manual" creation refers to the creation of a custom user interface control in response to a request to generate a control, as compared to automatic creation which may occur independently of a request. At block 302, a request to generate a custom user interface control may be received. In some embodiments, the request may be to generate one or more custom user interface controls. For example, the request may specify a category, and may request generation of custom user interface controls that have an association with the category.

At block 304, a user and an action associated with the request may be identified. In some embodiments, the user and/or the action may be specified in the request, in which case some or all of block 304 may be omitted. Illustratively, the user may be identified based on a source of the request (e.g., a computing device associated with the user), and the action may be identified based on an order history or histories, as described with regard to FIG. 2.

At block 306, parameter values of the action may be obtained. In some embodiments, the parameters to use when performing the action may be determined as described with reference to blocks 210-218 of FIG. 2. In other embodiments, the parameters may be specified in the request at block 302, in which case block 306 may be omitted. At block 308, information may be obtained regarding a plurality of previous actions. For example, in embodiments where a category is specified, an order history may be obtained for items within the category. As a further example, an order history may be obtained for the user identified in block 304.

At block 310, a parameter that does not have an alternate value may be selected. For example, a "size" parameter may be selected having the value "one gallon." At block 312, an alternate value for the parameter may be determined based on the plurality of previous actions. For example, the user's order history may include orders for the particular item in a one-quart size, and a determination may be made that the one-quart size may be used as an alternative value for the size parameter. In some embodiments, a determination may be made that the parameter does not have an acceptable alternative value. For example, the user's order history may include only orders that were placed using a single payment method, or that were shipped to a single address. The routine 300 may thus determine that the action associated with the custom user interface control should only be performed with the specified parameter.

At decision block 314, a determination may be made as to whether alternate values have been determined for all parameters (or, in embodiments described above, whether an alternate value determination has been attempted for all parameters). If not, the routine 200 branches to block 310, selects another parameter, and iterates through blocks 312 and 314. In some embodiments, a subset of the parameters may be determined, and alternate values may only be determined for parameters within the subset. If the determination at decision block 314 is that no further determinations needs be made, then the routine 300 branches to block 316, where in some embodiments the custom user interface control(s) and associated information may be stored. For example, generated custom user interface controls may be associated with a user and/or user account and stored in a data store. The controls may then be retrieved and presented when the user logs in, requests a user interface, or registers or associates a device capable of displaying custom user interface controls. In other embodiments, generated custom user interface control(s) may be output at block 316. For example, the generated custom user interface controls, or a user interface including the custom user interface controls, may be output to a computing device of the user.

It will be understood that the interactions of routine 300 may be varied, combined, or separated within the scope of the present disclosure. In addition to the examples described above, block 308 may be carried out at any time prior to block 312, and blocks 306 and 308 may be carried out in either order. Further, in some embodiments, block 306 may be carried out with blocks 310-314, and the routine 300 may determine values for the parameters of the action iteratively as it determines alternative values.

Figure 4:
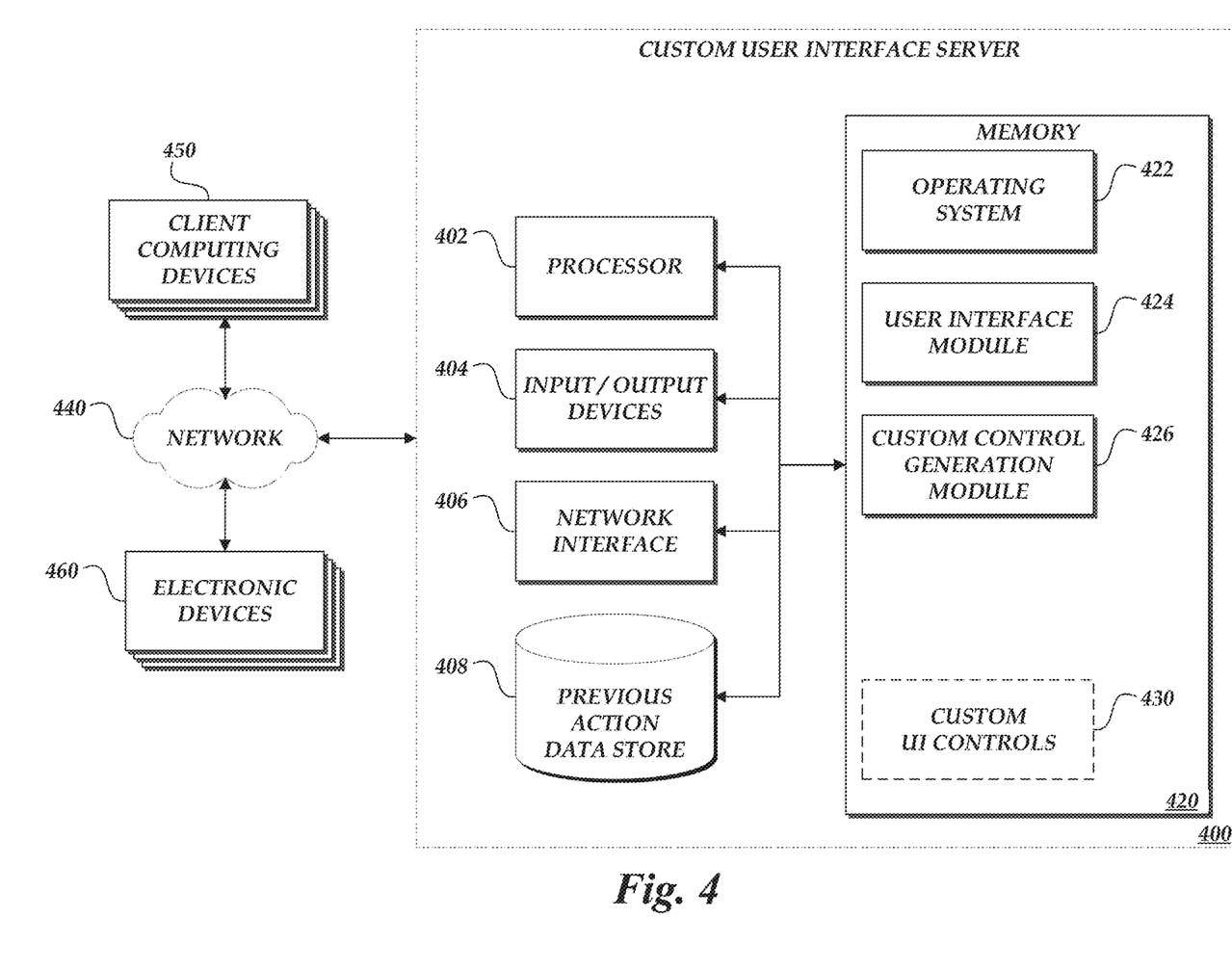
FIG. 4 is an illustrative network topology depicting a general architecture of an example computing device configured to implement aspects of the present disclosure.

FIG. 4 further depicts a network topology including client computing devices 450, electronic devices 460, a network 440, and a general architecture of a custom user interface server 400, which includes an arrangement of computer hardware and software components that may be used to implement aspects of the present disclosure. The network topology and the custom user interface server 400 may include many more (or fewer) elements than those shown in FIG. 4. It is not necessary, however, that all of these elements be shown in order to provide an enabling disclosure.

As illustrated, the custom user interface server 400 includes a processor 402, input/output devices 404, a network interface 406, and a data store 408, all of which may communicate with one another by way of a communication bus. The network interface 406 may provide connectivity to one or more networks (such as network 440) or computing systems and, as a result, may enable the custom user interface server 400 to receive and send information and instructions from and to other computing systems or services.

The processor 402 may also communicate to and from a memory 420. The memory 420 may contain computer program instructions (grouped as modules or components in some embodiments) that the processor 402 may execute in order to implement one or more embodiments. The memory 420 generally includes RAM, ROM, and/or other persistent, auxiliary, or non-transitory computer-readable media. The memory 420 may store an operating system 422 that provides computer program instructions for use by the processor 402 in the general administration and operation of the custom user interface server 400. The memory 420 may further store specific computer-executable instructions and other information (which may be referred to herein as "modules") for implementing aspects of the present disclosure. For example, the memory 420 may include a user interface module 424, which may perform various operations with regard to displaying the user interfaces described herein. For example, the user interface module 424 may store and retrieve templates for user interfaces that specify a number and placement of custom UI controls.

In some embodiments, the memory 420 may include a custom control generation module 426, which may be executed by the processor 402 to perform various operations, such as those operations described with reference to FIGS. 2 and 3. The memory 420 may further include custom UI controls 430 that are loaded into the memory 420 as various operations are performed.

While the operating system 422, the user interface module 424, and the custom control generation module 426 are illustrated as distinct modules in the memory 420, in some embodiments, the user interface module 424, and the custom control generation module 426 may be incorporated as modules in the operating system 422 or another application or module, and as such, separate modules may not be required to implement some embodiments. In some embodiments, the user interface module 424 and the custom control generation module 426 may be implemented as parts of a single application.

It will be recognized that many of the components described in FIG. 4 are optional and that embodiments of the custom user interface server 400 may or may not combine components. Furthermore, components need not be distinct or discrete. Components may also be reorganized. For example, the custom user interface server 400 may be represented in a single physical device or, alternatively, may be split into multiple physical devices. In some embodiments, components illustrated as part of the custom user interface server 400 (such as the custom control generation module 426) may additionally or alternatively be included in the client computing devices 450 or the electronic devices 460, such that some aspects of the present disclosure may be performed by the custom user interface server 400 while other aspects are performed by a client computing device 450 or electronic device 460.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A system comprising:
   a data store configured to store computer-executable instructions; and
   a processor in communication with the data store, wherein the computer-executable instructions, when executed by the processor, configure the processor to perform operations including:
   causing display of a user interface on a computing device associated with a user, wherein the user interface enables entry of requests to generate custom user interface controls;
   receiving, from the computing device associated with the user, a request to generate a custom user interface control, the request specifying at least a first action to be associated with the custom user interface control;
   determining, based at least in part on the first action, a default set of parameters to use when performing the first action;
   determining, based at least in part on the first action and the default set of parameters, an alternate set of parameters to use when performing the first action;
   storing data representing the custom user interface control, wherein the data associates a unique identifier of the custom user interface control with the user, the first action, the default set of parameters, and the alternate set of parameters, wherein each of the default set of parameters and the alternate set of parameters can be used to perform the first action at a time when the data representing the custom user interface control is initially stored;
   subsequent to the time when the data representing the custom user interface control is initially stored, causing the computing device associated with the user to display a user interface that includes the custom user interface control;
   receiving, from the computing device associated with the user, a first selection of the custom user interface control;
   identifying the first action, the default set of parameters, and the alternate set of parameters based on the unique identifier of the custom user interface control;
   in response to receiving the first selection of the custom user interface control, determining, at a first time period, that the default set of parameters can be used to perform the first action;
   in response to the first selection, causing performance of the first action using the default set of parameters based on determining that the default set of parameters can be used to perform the first action at the first time period;
   receiving, from the computing device associated with the user, a second selection of the custom user interface control;
   in response to receiving the second selection of the custom user interface control, determining, at a second time period, that at least one parameter in the default set of parameters cannot be used to perform the first action; and
   in response to the second selection, causing performance of the first action using the alternate set of parameters based on determining that the at least one parameter cannot be used to perform the first action at the second time period.

2. The system of claim 1, wherein a first parameter of the alternate set of parameters specifies one or more of a different item identifier, shipping method, payment method, shipping address, delivery method, item quantity, item size, or item provider than a corresponding parameter of the default set of parameters.

3. The system of claim 1, wherein determining the default set of parameters is based at least in part on one or more previously performed actions.

4. The system of claim 3, wherein the one or more previously performed actions were performed by the user.

5. The system of claim 1, wherein determining that at least one parameter in the default set of parameters cannot be used to perform the first action comprises determining that an item associated with the at least one parameter is out of stock.

6. A computer-implemented method comprising:
   obtaining a request to generate a custom user interface control, the request including a first action to associate with the custom user interface control;
   determining, based at least in part on the first action and a default set of parameters to use when performing the first action, an alternate set of parameters to use when performing the first action;
   storing data representing the custom user interface control, wherein the data associates a unique identifier of the custom user interface control with a user, the first action, the default set of parameters, and the alternate set of parameters, wherein each of the default set of parameters and the alternate set of parameters can be used to perform the first action at a time when the data representing the custom user interface control is initially stored;

subsequent to the time when the data representing the custom user interface control is initially stored, causing a computing device associated with the user to display a user interface that includes the custom user interface control;

receiving, from the computing device associated with the user, a first selection of the custom user interface control;

identifying the first action, the default set of parameters, and the alternate set of parameters based on the unique identifier of the custom user interface control;

determining, at a first time period, that the first action should be performed using the default set of parameters;

in response to the first selection, causing performance of the first action using the default set of parameters;

receiving, from the computing device associated with the user, a second selection of the custom user interface control;

determining, at a second time period, based at least in part on a criterion associated with a first parameter of the default set of parameters, that the first action should be performed using the alternate set of parameters; and in response to the second selection, causing performance of the first action using the alternate set of parameters.

7. The computer-implemented method of claim 6 further comprising determining the default set of parameters to use when performing the first action.

8. The computer-implemented method of claim 6, wherein the default set of parameters is determined based at least in part on one or more of the user, the first action, or a set of previously performed actions.

9. The computer-implemented method of claim 6, wherein the default set of parameters are specified by the user.

10. The computer-implemented method of claim 6, wherein the criterion specifies one or more of a threshold value of the first parameter, availability of an alternate item, or that the user is a member of a group eligible to perform the first action with the first parameter.

11. The computer-implemented method of claim 6, wherein the criterion specifies a range of acceptable values for the first parameter.

12. The computer-implemented method of claim 11 further comprising determining the range of acceptable values based at least in part on a set of previously performed actions.

13. The computer-implemented method of claim 6, wherein the first action is determined based at least in part on a set of previously performed actions that were performed by the user.

14. The computer-implemented method of claim 6, wherein the first action comprises one or more of placing an order, making a donation, scheduling an appointment, sending a message, reserving or releasing a resource, adjusting lighting or temperature, starting or stopping a device, or increasing or decreasing a setting.

15. The computer-implemented method of claim 6, wherein the custom user interface control corresponds to a physical electronic device.

16. The computer-implemented method of claim 15, wherein obtaining the request to generate the custom user interface control comprises determining that the physical electronic device does not have a corresponding custom user interface control.

17. A non-transitory computer-readable medium having stored thereon computer-executable instructions that, when executed by a processor, configure the processor to perform operations including:

determining, based at least in part on a first action and a default set of parameters to use when performing the first action, an alternate set of parameters to use when performing the first action;

storing data representing a custom user interface control, wherein the data associates a unique identifier of the custom user interface control with the first action, the default set of parameters, and an alternate set of parameters, wherein each of the default set of parameters and the alternate set of parameters can be used to perform the first action at a time when the data representing the custom user interface control is initially stored;

receiving, from a computing device associated with a user, a first selection of the custom user interface control;

identifying the first action, the default set of parameters, and the alternate set of parameters based on the unique identifier of the custom user interface control;

determining, at a first time period, that the first action should be performed using the default set of parameters;

in response to the first selection, causing performance of the first action using the default set of parameters;

receiving, from the computing device associated with the user, a second selection of the custom user interface control;

determining at a second time period, based at least in part on a criterion associated with a first parameter of the default set of parameters, that the first action should be performed using the alternate set of parameters; and in response to the second selection, causing performance of the first action using the alternate set of parameters.

18. The non-transitory computer-readable medium of claim 17 having stored thereon further computer-executable instructions that, when executed by the processor, configure the processor to perform further operations including:

receiving, from the computing device associated with the user, a request to generate the custom user interface control.

19. The non-transitory computer-readable medium of claim 17, wherein determining the alternate set of parameters is based at least in part on a set of previously performed actions.

20. The non-transitory computer-readable medium of claim 19, wherein the set of previously performed actions were performed by the user.

* * * * *